PRECORRECTION LOOP FOR A SIGNAL MODULATION SYSTEM

Filed June 23, 1967 2 Sheets-Sheet 1

INVENTOR.
WAYNE K. HODDER

BY. [signature]

ATTORNEY.

Oct. 27, 1970 W. K. HODDER 3,536,860

PRECORRECTION LOOP FOR A SIGNAL MODULATION SYSTEM

Filed June 23, 1967 2 Sheets-Sheet 2

United States Patent Office 3,536,860
Patented Oct. 27, 1970

3,536,860
PRECORRECTION LOOP FOR A SIGNAL MODULATION SYSTEM

Wayne K. Hodder, Glendora, Calif., assignor to Bell & Howell Company, Chicago, Ill., a corporation of Illinois Filed June 23, 1967, Ser. No. 648,443
Int. Cl. G11b 5/04; H04b 1/62
U.S. Cl. 179—100.2 13 Claims

ABSTRACT OF THE DISCLOSURE

A modulator-demodulator system including a feedforward loop associated with the modulator part of the system and primarily composed of a replica of the system modulator and a replica of the system demodulator for precorrecting potential errors in the system modulation-demodulation process.

BACKGROUND OF THE INVENTION

Field of the invention

The present invention relates to electric information signal processing systems and, more particularly, to systems in which information signals are subjected to modulation-demodulation or other transfer function—inverse transfer function processes.

Description of the prior art

Systems for modulating a carrier wave with an information signal and for subsequently reconstructing the information signal from the modulated carrier wave by means of a process frequently referred to as "demodulation" are well known in the art.

Systems of this type have found wide application in the transmission of information under circumstances in which the transmission of a carrier wave modulated by the information signal in question has been found more advantageous than the transmission of the information signal itself, or in which the transmission of the information signal as such would not have been possible.

More recently, such modulating systems have found application in the recording and subsequent reproduction of infromation. To name an illustrative example, reference is made to the recording and subsequent reproduction of modulated measurement parameters by means of magnetic tape recorders, and to the similar recording of television programs.

In the latter area, the recording of a carrier signal modulated by the video signal has become preferred over the recording of the video signal itself, since video signals as such are difficult to accommodate on a magnetic tape, as they extend from the decacycle to the megacycle range. Frequency modulation became soon preferred in this field over amplitude modulation, since amplitude modulation was more prone to introduce undulating signal distortions (see Anderson, The Modulation System of the Ampex Video Tape Recorder, 66 Journal of the SMPTE, p. 182 (April 1957)).

Since magnetic tape recording systems naturally have a limited bandwidth, the permissible frequency of the carrier signal is accordingly limited so that the maximum excursion of the frequency of the modulating information signal tends to be relatively close to the carrier signal frequency. This applies to video signal recording as well as to advanced measurement parameter recording.

As is well known, modulation and demodulation processes employing time-modulated carriers do not even provide for a theoretical distortion-free reconstruction of the original modulating information signal when the maximum modulating frequency approaches the average carrier frequency or half the effective sampling frequency.

To date the prior art generally either has accepted distortions of this type as unavoidable, or has taken steps toward their correction during the demodulation process.

SUMMARY OF THE INVENTION

The subject invention provides a novel approach to the above-mentioned problem. This approach broadly resides in a precorrection of potential signal distortions due to imperfections, including inherent shortcomings, in modulation-demodulation processes, or in other processes in which electric signals are subjected to a first transfer function and are subsequently subjected to a second transfer function being an inverse of the first transfer function.

The invention is, for example, applicable to information signal processing systems, such as information signal transmitting systems or information signal recording and reproduction systems, in which information input signals are subjected to a modulation action in a system modulator and are subsequently recovered by means of a demodulation action in a system demodulator, and in which these modulation and demodulation actions tend to produce error signals in the recovered information signals.

According to one aspect of the subject invention, such a system is provided with a feedforward loop having input means connected to receive information input signals and having output means. This feedforward loop includes an auxiliary modulator, an auxiliary demodulator, and means for interconnecting the auxiliary modulator and the auxiliary demodulator between the named input and output means to cause the auxiliary modulator and the auxiliary demodulator to perform on the input signals a modulation-demodulation action for producing at the named output means correction signals corresponding to at least a part of said error signals.

The system according to the invention further includes a main loop having input means for receiving said information input signals and having output means connected to the system modulator and including means connected between the main loop input means and the main loop output means and connected to the above-mentioned output means of the feedforward loop for precorrecting at least part of the mentioned error signals with the aid of the named correction signals. A preferred mode of precorrection resides in a predistortion of the modulating signal applied to the system modulator. This predistortion is effected with the aid of the named correction signals or with the aid of predetermined parts thereof, such as predetermined frequency components, and proceeds to the end of suppressing or reducing potential error signals occurring during the system modulation-demodulation processes.

The invention is applicable to various types of signal modulation, such as time modulation or amplitude modulation. In the case of time modulation, which may be angle modulation (phase modulation, frequency modulation) or pulse modulation (e.g., pulse duration modulation, pulse interval modulation), the invention may provide for a precorrection of error signals inherent in the operation of time modulation systems, and of error signals stemming from design limitations. While the benefit of such a precorrection is particularly pronounced in cases where the frequency of the modulating signal is comparatively close to that of the carrier, the invention also yields significant advantages when the modulating frequency remains considerably below the carrier frequency.

In the case of amplitude modulation, a substantially distortion-free modulation-demodulation process is theoretically possible even if the modulating frequency comes relatively close to the carrier frequency. Errors of the type herein considered are then primarily due to design considerations or limitations. It is a feature of the subject invention that it is also capable of precorrecting errors of the latter type.

As this description proceeds, it will be noted that a further feature of the subject invention resides in the precorrection of errors inherent in the operation of transmission links or of signal recording and reproduction equipment.

It should also be understood that the invention is not limited to modulator-demodulator systems, but may broadly be applied to signal processing systems in which electric signals are subjected to a first transfer function and subsequently to a second transfer function.

BRIEF DESCRIPTION OF THE DRAWINGS

The subject invention will be further understood from the following detailed description of preferred embodiments thereof, illustrated by way of example in the accompanying drawings, in which.

DESCRIPTION OF THE PREFERRED EMBODIMENTS

Figure 1:
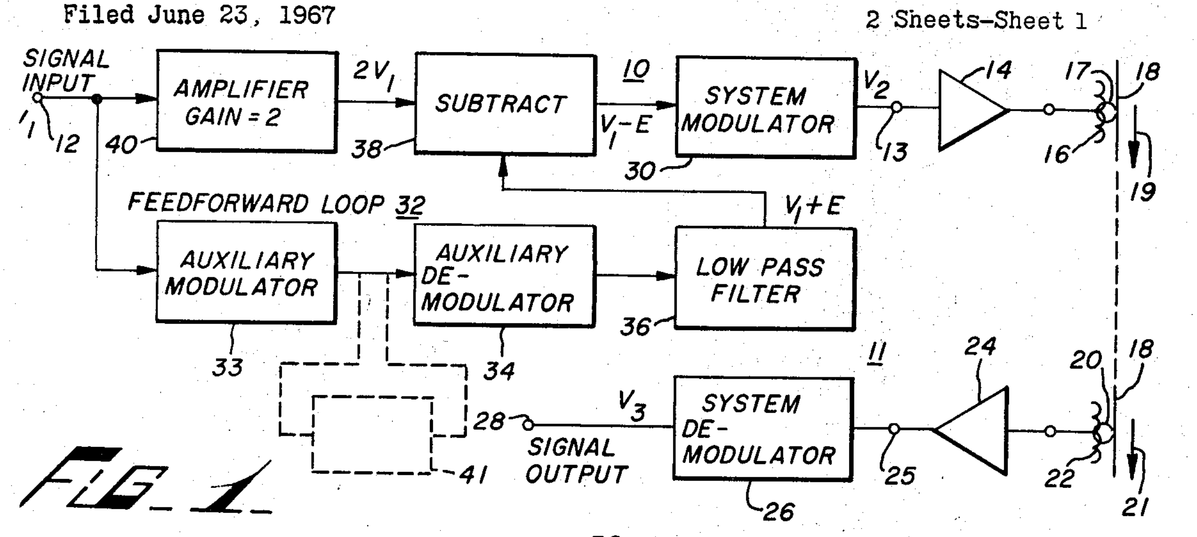
FIG. 1 is a block diagram of a modulator-demodulator system embodying the subject invention.

The modulator-demodulator system of FIG. 1 includes modulator apparatus 10 and demodulator apparatus 11. The modulator apparatus has an input 12 for electric information signals $V_1$ and an output 13 for signals $V_2$ composed of a carrier wave modulated by the information contained in the signals $V_1$. The modulated output signals $V_2$ are amplified by a conventional amplifier 14 and are thereupon applied to the coil 16 of a magnetic recording head 17. The recording head 17 magnetically records the amplified signals $V_2$ on a magnetic recording tape 18 which is transported in the direction of arrow 19 by means of a conventional tape drive (not shown).

When the information recorded on tape 18 is desired to be played back, the tape 18 is brought into operative relationship with a magnetic pickup or playback head 20 and is moved in the direction of arrow 21 by means of a conventional tape drive (not shown).

The pickup head 20 has a coil 22 which electrically reproduces the information contained on tape 18 or, more exactly, the above-mentioned carrier wave modulated by the information contained in the signals $V_1$.

It should be understood in this connection that the embodiment shown in FIG. 1, as well as the other embodiments shown herein, is not limited to systems in which information is recorded and subsequently played back. It would, for instance, be possible to replace the recording-playback system by a transmission link or channel, such as a wire-bound or wireless transmission system or the like.

The played back signal is applied by the coil 22 to an amplifier 24 and the amplified signal is applied to an input 25 of a system demodulator 26 of the demodulator apparatus 11. The system demodulator 26 demodulates the signal amplified by the amplifier 24 by producing signals $V_3$ which ideally correspond to the above-mentioned information signals $V_1$. The signals $V_3$ are applied to a signal output 28 for further processing, such as by apparatus (not shown) for reproducing the signals $V_3$ audibly, visibly or in another desired fashion.

The modulator apparatus 10 has a system modulator 30 operatively located between the signal input 12 and the output 13 for producing the above-mentioned modulated signals $V_2$.

Both the system modulator 30 and the system demodulator 26 may be of conventional design. For instance, if it is desired to employ frequency modulation in the system shown in FIG. 1, the modulator 30 may be a frequency modulator of conventional design, including standard means (not shown) for providing the required carrier wave onto which the information-containing signal is modulated. The system demodulator 26 may then comprise an FM demodulator or detector which reconstructs the information signal from the carrier wave and which may also be of a standard design.

If we disregard for the moment the correction means and circuits shown in FIG. 1 but not so far described, we will find that the inherent operation of the system modulator 30 and system demodulator 26 tends to give rise to error signals.

To illustrate this point, the following equation may be established $$V_3 \equiv G_d[V_2] \equiv G_d[G_m[V_1]] \quad (1)$$

wherein:

$G_m$ denotes the function of the system modulator 30;
$G_d$ denotes the function of the system demodulator 26;
$V_1$ denotes the information signals received at input 12;
$V_2$ denotes the information-modulated signals which occur at modulator output 13 and, by an idealized assumption established for the purpose of a broad analysis, also the information-modulated signals occurring at input 25; and
$V_3$ denotes the reconstructed information signals occurring at system output 28.

It follows from Equation 1 that $V_3$ is a true replica of $V_1$ only if $G_d$ is an exact inverse function of $G_m$. In practice, this will generally not be the case. Rather, the following relationship will obtain $$V_3 = V_1 + E \quad (2)$$

wherein E is an error term introduced by the functions $G_m$ and $G_d$ of the system modulator and demodulator.

The error term E is fundamentally inherent in the operation of many modulation-demodulation systems and primarily manifests itself in the presence of spectral distortion frequency components in the demodulator output signal $V_3$. As is well known, for instance, the occurrence of spectral distortion frequency components in the reproduced information signal is inherent in time-modulation systems.

As the upper limit of the frequency of the information signals $V_1$ approaches the frequency of the carrier wave onto which the information signals $V_1$ are modulated, the distortion spectra increase in range and amplitude and intrude even into the range or bandwidth of the information signal, so as to be no longer susceptible to removal by filter means.

For the purpose of reducing this error term, the system of FIG. 1 includes a feedforward loop 32 having an auxiliary modulator 33 connected to the signal input 12 and an auxiliary demodulator 34 connected to the modulator 33. The auxiliary modulator 33 is a replica in design and operation of the system modulator 30, and the auxiliary demodulator 34 is a replica in design and operation of the system demodulator 26.

The modulator 33 employs the same carrier frequency as the modulator 30 and produces an auxiliary signal composed of the carrier having the information signal $V_1$ modulated thereon. This modulated auxiliary signal is demodulated by the modulator 34. Since the modulator 33 and demodulator 34 are replica of the type mentioned above, the output signal of the demodulator 34 naturally includes the above-mentioned error term E composed of distortion frequency spectra.

In the illustrated embodiment, the feedforward loop 32 further includes a low-pass filter 36 connected to the auxiliary demodulator 34 for removing from the output signal of this demodulator selected frequency components, such as those error components which have freqeuncies above the frequency of the carrier wave employed in the modulator 33. It has been found in practice that the provision of filter 36 is particularly advantageous in those situations in which error frequency components above carrier frequency are prominent, and are sometimes stronger than the fundamental modulated signal itself.

In accordance with the subject invention, the apparatus 10 includes means 38 for subjecting the information input signals to a modifying action before these signals are applied to the system modulator 30 as modulating signals. This modifying action includes a removal from said information signals of signals which correspond to the error term produced by the feedforward loop 32.

In the illustrated embodiment, the information signal $V_1$ received at input 12 is amplified by an amplifier 40 having a gain of two to produce an amplified information signal of $2V_1$.

Both this signal $2V_1$ and the signal $V_1+E$ from the output of the low-pass filter 36 are applied to the modifying means 38 just discussed, which is here shown as a subtraction network that may be of a conventional design and that subtracts the signal $V_1+E$ from the signal $2V_1$, so as to produce at its output a modified information signal of $V_1-E$.

Those skilled in the art will recognize that the modified signal $V_1-E$ could also be produced by excluding $V_1$ from the output of the feedforward loop 32 and by subtracting the term E from the signal $V_1$ occurring at the input 12. This illustrates a second method of many possible ways to obtain the modified information signal of $V_1-E$.

The modified signal $V_1-E$ is the modulation signal input of the system modulator 30 which modulates the carrier wave by this modified signal.

For the reasons discussed above, the system modulator 30 and system demodulator 26 tend to introduce in their operation an error term E into the system output signal $V_3$. This error term E is substantially precorrected by the error term −E in the above-mentioned modified signal. In actuality, this precorrection does not result in a total elimination of all error. For instance, the error term itself will introduce a derivative error term. However, the latter generally is comparatively small and is negligible for most practical purposes or constitutes an acceptable compromise even in situations in which the derivative error is still noticeable.

The system of FIG. 1 thus presents a material advance in the art.

It may be noted in this connection that this system employing the illustrated feedforward loop 32 is substantially superior to a system which would employ a feedback loop connected between the modulator output 13 and the subtraction network 38 and including an auxiliary demodulator constituting a replica of the system demodulator 26 and a filter of the type of filter 36. Such a feedback system is prone to give rise to undesirable oscillations.

If desired, the system of FIG. 1 may include a means for precorrecting the modulation signal for the system modulator 30 also as to error terms which are introduced by the recording and reproduction system connected between the amplifiers 14 and 24 or by a transmission link employed in lieu of the recording-reproduction equipment. As shown in dotted outline, the feedforward loop 32 in FIG. 1 may include a network 41 which connects the auxiliary modulator 33 to the auxiliary demodulator 34 and which simulates predetermined criteria of the recording-reproduction system 16 through 22, or of a transmission link, that give rise to error terms or signals.

For instance, it may be desirable that the network 41 simulate those criteria of the transmission link or recording-reproduction equipment that give rise to error signals which manifest themselves in substantial error term frequency spectra in the signal $V_3$. Non-linear transmission or recording-reproduction phenomena are mentioned in this connection.

The network 41 may be of a conventional design used to simulate predetermined characteristics of transmission or recording-reproduction systems by means of circuit components, such as resistances, inductances, capacitors or delay lines. The theory and techniques for designing such types of networks are well known in the art.

In brief, the network 41 introduces into the feedforward loop 32 an error term which is included in the error term E for further precorrecting the modulation signal of the system modulator 30.

Figure 2:
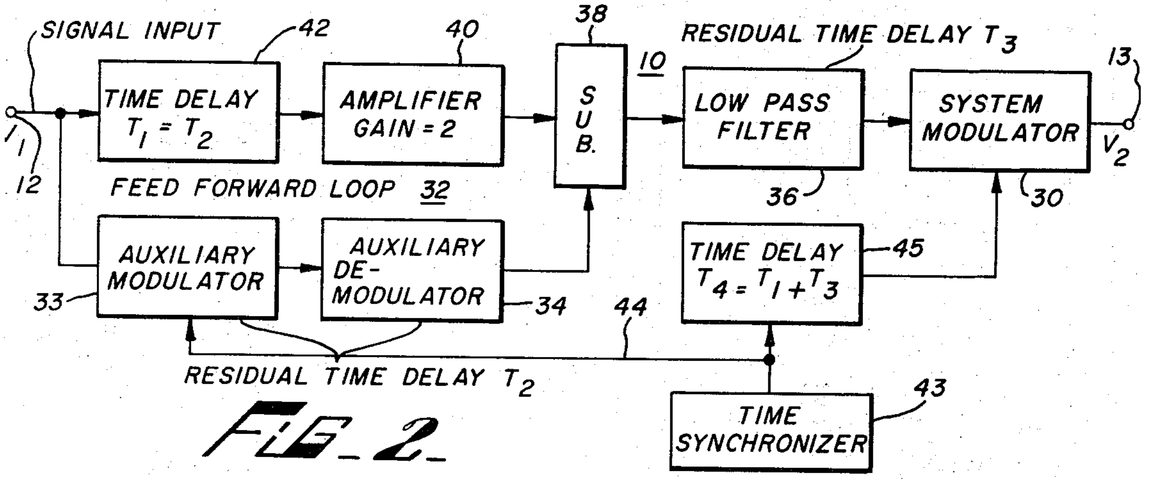
FIG. 2 is a block diagram of a modification of the system of FIG. 1.

FIG. 2 illustrates modifications of the system shown in FIG. 1, so that like reference numerals are employed to designate like parts as among FIGS. 1 and 2. For the purpose of increased clarity, only the modulator apparatus 10 between the system input terminal 12 and the modulator output terminal 13 is shown in FIG. 2. The remainder may be the same as in FIG. 1.

The apparatus shown in FIG. 2 again includes the above-mentioned system modulator 30, feedforward loop 32, subtraction network 38, and information signal amplifier 40.

As a first modification, the previously described low-pass filter 36 is in FIG. 2 located between the subtraction network 38 and the system modulator 30, rather than in the feedforward loop 32, as was the case in FIG. 1. This modification, which may also be employed in the apparatus of FIG. 1, is advantageous in systems in which time delays produced by the filter 36 are not desired to be present in the feedforward loop 32.

As a second modification, the apparatus shown in FIG. 2 includes a system modulator 30 and an auxiliary modulator 33 which are adapted to be synchronized as to the carriers with which they operate. Such carrier synchronization is, for example, readily possible in pulse duration modulation. The system modulator 30 employed in FIG. 2, as well as its replica, the auxiliary modulator 33, may be of a conventional design in which the operation of the means for producing the carrier wave for the system modulator 30 and the operation of the means for producing the carrier wave for the auxiliary modulator 33 are synchronized by clock or time pulses.

In FIG. 2, a time delay network 42 is connected between the information signal input 12 and the amplifier 40 for imposing upon the information signal a time delay $T_1$ which substantially corresponds to the residual time delay $T_2$ of the output signal of the feedforward loop 32 relative to the information signal received at system input 12. The goal is to have a phase-correct subtraction of the error term from the information signal at the subtraction network 38.

The apparatus of FIG. 2 further includes a synchronization signal generator 43 which may be of a conventional design. The carrier synchronization signals or clock pulses produced by the generator 43 are applied by a line 44 to the auxiliary modulator 33 to synchronize the generation of the carrier wave used in this modulator 33.

The carrier synchronization signals produced by the generator 43 are also applied through a time delay network 45 to the system modulator 30 to synchronize the generation of the carrier wave used in the system modulator 30. The network 45, which may be of conventional design, imposes upon the carrier synchronization signals supplied to the modulator 30 a time delay $T_4$ which substantially corresponds to the time delay of the modulation signal applied to the system modulator 30 relative to the modulation signal applied to the auxiliary modulator 33.

The result is a phase-correct insertion of the error term into the modulation signal of the system modulator 30, so that error terms inherent in the operation of the system modulator and system demodulator are precorrected in the proper phase relationships.

Figure 3:
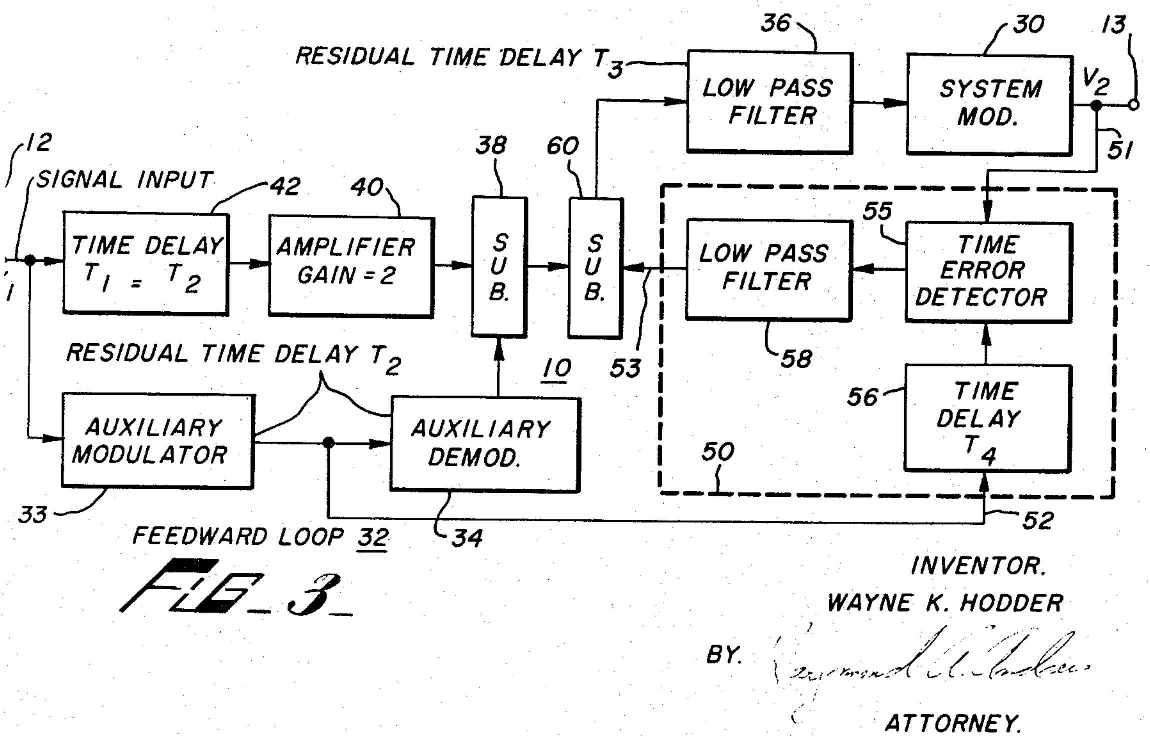
FIG. 3 is a block diagram of a further modification of the system of FIG. 1.

FIG. 3 shows a modification which is similar to a certain extent to the midification shown in FIG. 2, so that like reference numerals are employed to designate like parts as among FIGS. 2 and 3.

As in FIG. 2, only the modulation apparatus 10 of the modulation-demodulation system is shown in FIG. 3. This modulation apparatus includes the previously described system modulator 30, the feedforward loop 32 with auxiliary modulator 33 and auxiliary demodulator 34, the low-pass filter 36, the substraction network 38, the amplifier 40, and the time delay network 42, operating in the manner explained above.

In addition, the apparatus of FIG. 3 includes a time lock loop 50 having an input 51, an input 52, and an output 53. The time lock loop includes a time error detector 55 connected to the input 51, and connected to the input 52 through a time delay network 56.

The input 51 is connected to the output of the system modulator 30 to receive the modulated signal $V_2$. The input 52 is connected to the output of the auxiliary modulator 33 to receive the auxiliary modulated signal produced by this modulator 33. The time delay network 56 imposes on this auxiliary modulaated signal, before it is applied to the time error detector 55, a time delay $T_4$ which substantially corresponds to the time delay of the output signal of modulator 30 relative to the output signal of modulator 33.

The time error detector 55 may be a conventional type of phase detector which compares the output signal of the system modulaator 30 and the delayed output signal of the auxiliary modulator 33 and produces an output signal indicative of the time error between the two compared signals just mentioned.

In many instances, it will be found that conventional phase detectors impose frequency-dependent time displacements on the signals processed by them. A compromise is to a certain extent possible by carrying out adjustments in the time delay imposed by the network 56. Where this is not satisfactory, it is better to employ as the error detector 55 a time detector of the type frequently employed in radar range measurement equipment. These time detectors are capable of providing a substantially frequency-independent time displacement at their null position. This substantially constant time displacement can be taken into account when designing and adjusting the time delay network 56.

The time error signal produced by the detector 55 is processed through a frquency shaping low-pass filter 58. The output 53 of filter 58 is applied to a subtraction network 60 which precorrects the above-mentioned modified signal supplied by the subtraction network 38 by subtracting the time error signal supplied by the output 53 from the modified signal just mentioned.

The further modified signal supplied by the subtraction network 60 is applied through the previously described low-pass filter 38 to the system modulator 30 as its modulation signal.

Figure 4:
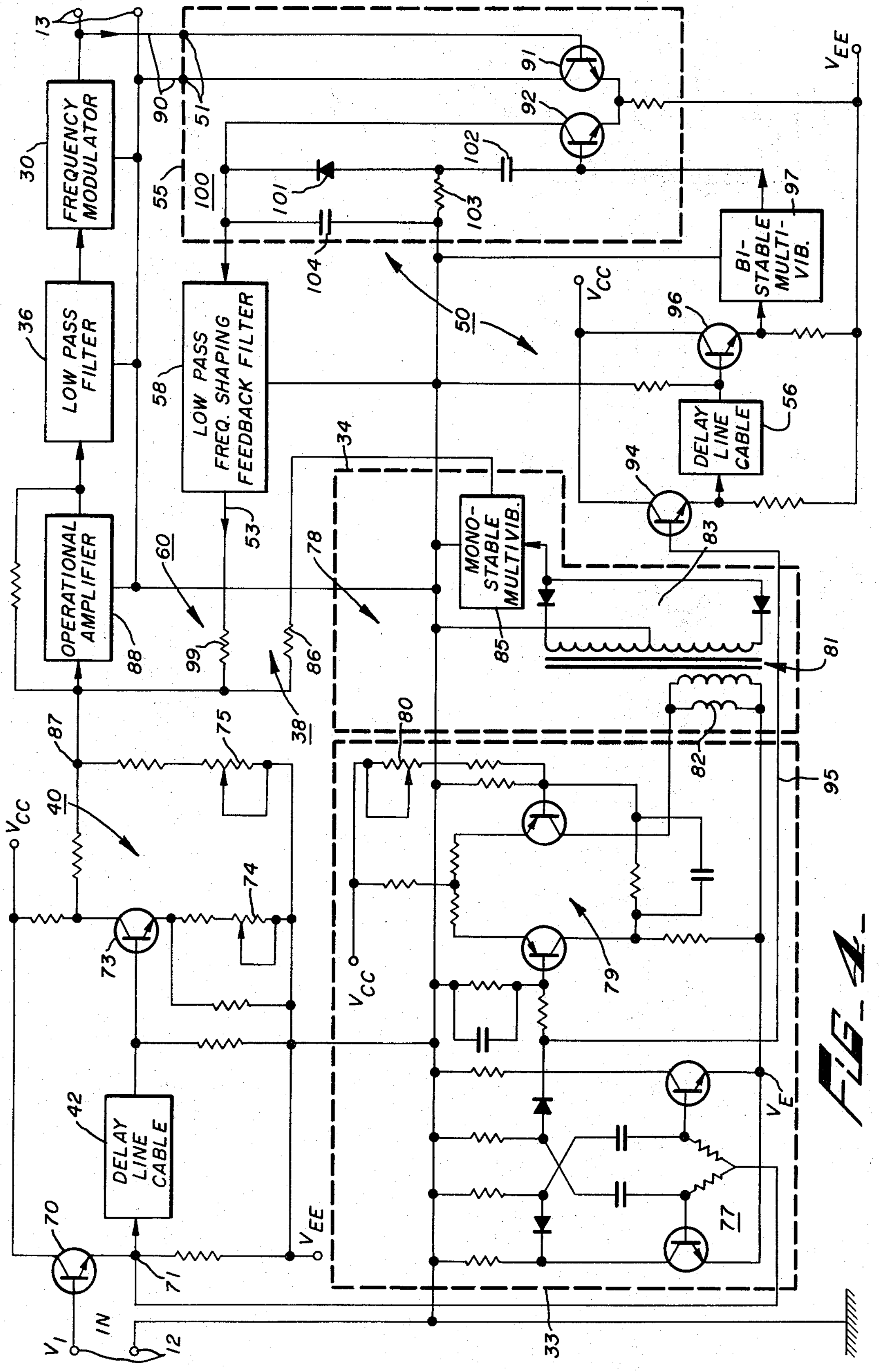
FIG. 4 is a circuit diagram of the apparatus according to FIG. 3.

The system illustrated in FIG. 3 is particularly applicable to nonsynchronous modulation systems, such as systems in which the system modulator 30 and its replica, the auxiliary modulator 33 are, for example, frequency-modulated multivibrator. FIG. 4 illustrates an example of a more detailed diagram of the apparatus shown in FIG. 3.

According to FIG. 4, the information input signal $V_1$ applied at the input terminals 12 is passed through an emitter-follower stage 70, which has an output terminal 71, and through the above-mentioned time delay network 42, which may be a delay line cable and which is connected to the terminal 71. The delayed information signal is amplified by a stage 73 which acts as the above-mentioned amplifier 40 and which has a potentiomenter 74 for gain adjustment purposes. A potentiometer 75 permits center-frequency adjustments.

The amplified information signal at terminal 71 is also applied to an astable multivibrator 77 which operates as a frequency modulator and acts as the previously discussed auxiliary modulator 33. The information-modulated signal is applied to a demodulator 78 which acts as the above-mentioned auxiliary demodulataor 34.

In the embodiment illustrated in FIG. 4, the modulated signal is first shaped as to symmetry by a bistable multivibrator 79 which has a symmetry trim potentiometer 80. The shaped modulated signal is thereupon demodulated by a pulse-averaging discriminator 81 which includes a differentiator 82 and a rectifier circuit 83. The demodulated signal is applied to a monostable multivibrator 85 which stablizes the pulse area of the demodulated signal.

The above-mentioned substraction network 38 includes a resistor 86 through which the output signal of the monostable multivibrator 85 passes to a terminal 87 to which the amplifier 73 is also connected. The aforesaid term $V_1+E$ provided by the feedforward loop 32 at the monostable multivibrator 85 is subtracted from the term $2V_1$ provided by the amplifier 40 (stage 73) with the aid of an operational amplifier 88 that has a negative gain and may be of conventional design.

After the information signal has been precorrected in this manner, it is passed through the above-mentioned low-pass filter 36, the function of which has already been described, and is applied to the system modulator 30 as a modulation signal. The circuit of this system modulator 30 may be seen from the illustrated circuit of the auxiliary modulator 33, since the latter is a replica of the former.

The information-modulated signal produced by the system modulator 30 is applied to the previously mentioned output 13 and, through leads 90, also to a transistor 91 which forms part of the above-mentioned time error detector 55. While the transistor 91 is controlled by the modulated output signal of the system modulator 30, the time error detector 55 includes a further transistor 92 which is controlled from the output of the auxiliary modulator 33.

To this end, an emitter-follwer stage 94 is connected to the auxiliary modulator 33 by a lead 95 to receive modulated signals therefrom. The signal processed by the stage 94 is passed through the above-mentioned delay line 56 and is thereupon applied to a further emitter-follower stage 96.

The output signal of the stage 96 is sharpened as to rise and fall times by a bistable multivibrator 97 of a conventional design and is thereupon applied as a control signal to the transistor 92. The transistors 91 and 92 operate as a phase detector in producing a signal that is indicative of phase errors between the modulated output signal of the system modulator 30 and the modulated output signal of the auxiliary modulator 33. To obtain the substantially frequency-independent time displacements mentioned above, the transistor 92 is connected to a current bucking circuit 100 which includes a discharge diode 101, a differentiating network composed of a capacitor 102 and a resistor 103, and a voltage smoothing capacitor 104. The time error signals occurring at the capacitor 104 are passed through the above-mentioned low-pass filter 58 and is thereupon applied to the subtraction network 60 which includes the resistor 99 connected, as shown in FIG. 4, to the terminal 87.

In this manner, the modulation signal of the system modulator 30 is precorrected not only as to the error signal provided by the feedforward loop 32, but also as to the time error signal provided by operation of the detector 55. It will be recognized in this connection that the circuits provided between the leads 90 and the terminal 87, and including the time error detector 55, the filter 58, and the resistor 99, can be viewed as a feedback loop for the system modulator 30, with the operation of this feedback loop being controlled in accordance with relative time errors between the system modulator and auxiliary modulator outputs. A precorrection of such time errors is obtained in this manner so as to have phase-correct insertion of the error term from the feedward loop 32.

The remainder of the system as to FIG. 4 may be as illustrated in FIG. 1, with the system demodulator 26 corresponding in circuitry to the auxiliary demodulator shown in FIG. 4, since the auxiliary demodulator is a replica of the system demodulator.

The apparatus according to FIG. 4 was successfully used in a prototype magentic tape recording-playback system operating with a carrier frequency of 900 kHz. (carrier deviation ±35%). In this prototype system, the feedforward loop 32 and the time correction loop 50, designed as shown in FIG. 4, provided for an error sideband suppression (third, fourth and fifth order sidebands) of the order of 20 decibels as compared to the sideband error signals occurring in the absence of the feedforward loop 32 and the time correction loop 50.

Those skilled in the art will recognize that some of the circuits shown in FIG. 4 for the purpose of further illustrating the system of FIG. 3, may also be used in the system of FIG. 1 or in the system of FIG. 2. This is, for instance, the case with respect to the circuits 77, 79, 82, 83 and 85, and the amplifier stages 73 and 88.

Also, while specific circuits and systems have been described and illustrated, various modifications within the scope of the subject invention are within the reach of the applied knowledge and learning of those skilled in the art.

I claim:

1. In a signal processing system in which electric signals are subjected to a first transfer function by first means and are subsequently subjected to a second transfer function being an inverse of said first transfer function by second means, and in which said first and second transfer functions tend to produce error signals in said signals subjected to said first and second transfer functions, the improvement comprising in combination with said first means:

(a) feedforward loop means including:
  (1) input means connected to receive said electric signals prior to their subjection to said first transfer function;
  (2) output means;
  (3) means connected between said input means and said output means for subjecting said electric signals received at said input means to a said first transfer function and subsequently to a said second transfer function to produce at said output means correction signals corresponding to at least a part of said error signals; and (b) main loop means having input means for receiving said electric signals and having output means connected to said first means and including means connected between said main loop input means and said main loop output means and connected to said output means of said feedforward loop means for precorrecting at least part of said error signals with the aid of said correction signals.

2. A system as claimed in claim 1, wherein said feedforward loop means include means performing a said first transfer function and being substantially a replica of said first means.

3. A system as claimed in claim 1, wherein said feedforward loop means include means performing a said second transfer function and being substantially a replica of said second means.

4. In an information signal processing system in which information input signals are subjected to a modulation action in a system modulator and are subsequently recovered by means of a demodulation action in a system demodulator, and in which said modulation and demodulation actions tend to produce error signals in said recovered information signals, the improvement comprising in combination with said system modulator:

(a) a feedforward loop having input means connected to receive said input signals and having output means, and including:
  (1) an auxiliary modulator;
  (2) an auxiliary demodulator;
  (3) means for interconnecting said auxiliary modulator and said auxiliary demodulator between said input means and said output means to cause said auxiliary modulator and said auxiliary demodulator to perform on said input signals a modulation-demodulation action for producing at said output means correction signals corresponding to at least a part of said error signals; and (b) a main loop having input means for receiving said input signals and having output means connected to said system modulator and including means connected between said main loop input means and said main loop output means and connected to said output means of said feedforward loop for precorrecting at least part of said error signals with the aid of said correction signals.

5. A system as claimed in claim 4, wherein said auxiliary modulator is substantially a replica of said system modulator.

6. A system as claimed in claim 4, wherein said auxiliary demodulator is substantially a replica of said system demodulator.

7. A system as claimed in claim 4, wherein said feedforward loop includes filter means connected between said auxiliary demodulator and said output means for excluding selected frequency components from said correction signals.

8. A system as claimed in claim 4, wherein said feedforward loop includes means simulating predetermined characteristics of a transmission link connected between said system modulator and said system demodulator for making in said corrections signals provisions for a precorrection of error signals which said predetermined characteristics tend to produce.

9. A system as claimed in claim 4, wherein said feedforward loop includes means simulating predetermined characteristics of information recording equipment connected to said system modulator and of information reproduction epuipment connected to said system demodulator for making in said correction signals provisions for a precorrection of error signals which said predetermined characteristics tend to produce.

10. A system as claimed in claim 4, wherein said means included in said main loop means include signal modifying action including a removal of signals corresponding to said correction signals from said input signals and for applying said modified input signals to said system modulator as modulation signals.

11. A system as claimed in claim 10, including filter means connected between said signal modifying means and said system modulator for excluding selected frequency components from said modulation signals.

12. A system as claimed in claim 4, including means connected to said system modulator and said auxiliary modulator for synchronizing the operations of said system modulator and said auxiliary modulator to assure a substantially time-correct precorrection of said part of said error signals.

13. A system as claimed in claim 12, wherein said synchronizing means include means connected to receive first output signals of said system modulator and to receive second output signals of said auxiliary modulator for producing time-error signals by comparing predetermined criteria of said first and second output signals.

References Cited

UNITED STATES PATENTS

| | | | |
|---|---|---|---|
| 2,649,506 | 8/1953 | Gayford et al. | 179—100.2 |
| 2,776,410 | 1/1957 | Guanella | 325—65 X |
| 3,246,085 | 4/1966 | Rabinow | 179—100.2 |

JAMES W. MOFFITT, Primary Examiner

R. S. TUPPER, Assistant Examiner

U.S. Cl. X.R.

325—65